No. 676,312. Patented June 11, 1901.
E. C. HAWTHORNE.
SAFETY BIT.
(Application filed Nov. 7, 1900.)
(No Model.)
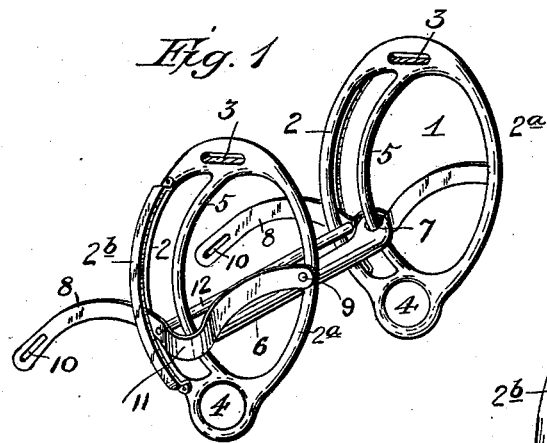
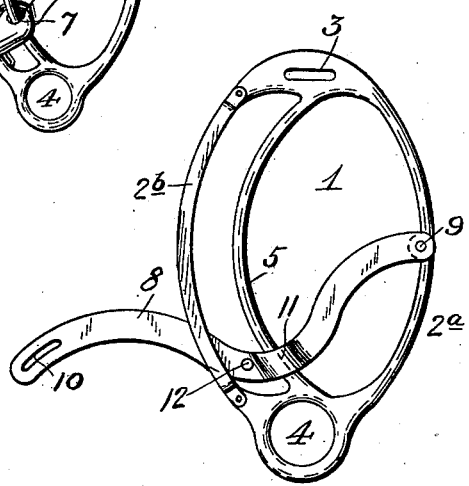
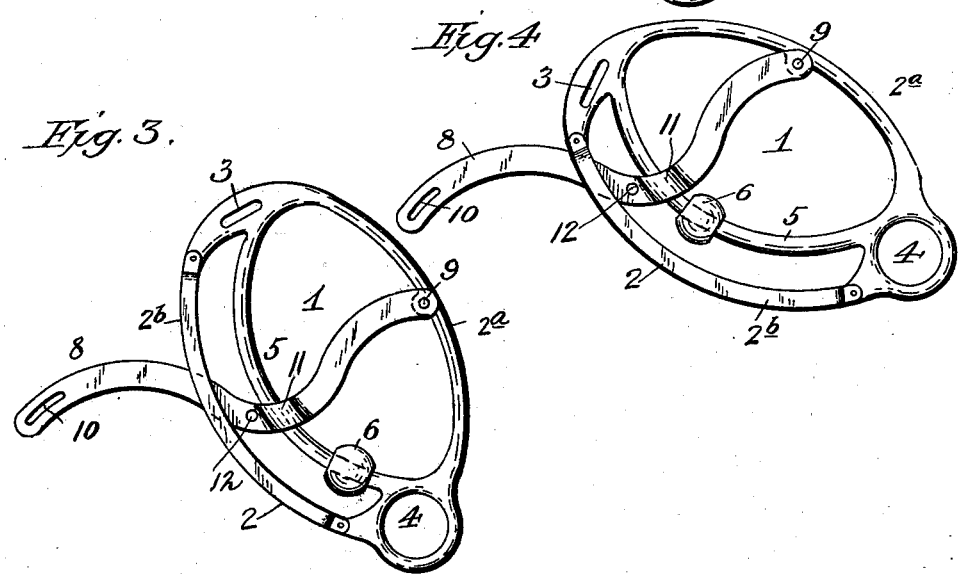
Witnesses
F. L. Ourand.
E. P. Bunyea
Inventor:
Edmund C. Hawthorne,
By Louis Bagger & Co.
Attorneys.

UNITED STATES PATENT OFFICE.

EDMUND C. HAWTHORNE, OF HARRISBURG, PENNSYLVANIA.

SAFETY-BIT.

SPECIFICATION forming part of Letters Patent No. 676,312, dated June 11, 1901.

Application filed November 7, 1900. Serial No. 35,716. (No model.)

*To all whom it may concern:*

Be it known that I, EDMUND C. HAWTHORNE, a citizen of the United States, residing at Harrisburg, in the county of Dauphin and State of Pennsylvania, have invented new and useful Improvements in Safety-Bits, of which the following is a specification.

My invention relates to safety-bits for horses; and one object of the same is to provide simple and efficient means for rendering the bit severe whenever the horse becomes unruly or attempts to run away, but which under normal conditions will serve as an ordinary bit.

Another object is to provide an overdraw check-bit with means for controlling the animal in case he should become fractious or attempt to kick or run away.

I attain these objects by means of the construction shown in the accompanying drawings, which form part of this specification, and in which—

Figure 1 is a perspective view of a safety-bit made in accordance with my invention. Fig. 2 is a side view of the same in its normal position, as it would be when the horse was going along all right and the reins subject to the ordinary tension. Fig. 3 is a side view illustrating the position the parts would occupy relative to each other when the horse was pulled up moderately to dissuade him from cutting up or kicking. Fig. 4 is a similar view showing the position of the bit when the horse was pulled up hard to keep him from running away.

Like numerals of reference designate like parts wherever they occur in the different views.

As shown in the drawings, the numerals 1 designate the cheek-rings of the bit, and these rings each consist of the bars 2 2$^a$, having a slot 3 for the cheek-strap of the bridle and the circular aperture 4 for the driving-reins. A curved bar 5, circular in cross-section, extends across the inner part of the ring 1, and connected to these bars 5 is the bit-bar 6. The ends of the bit-bar 6 are provided with apertures 7, which fit loosely upon the bars 5, so as to slide thereon, for a purpose which will hereinafter be referred to. The bar 2 of each cheek-ring is formed into a guideway consisting of the bars 2 2$^b$, and these bars may be either integral or the bar 2$^b$ may be secured to the bar 2, if found desirable. The overdraw-levers 8 are curved, as shown, and are pivoted at one end of the bar 2$^a$, as at 9. These levers 8 extend through the guideway formed by the bars 2 2$^b$ and are provided at their outer ends with apertures 10 for the overdraw-checkreins. The levers 8 are also outwardly curved at 11 to give room for the free sliding section of the bit-bar 6, and a small round cross-bar 12 extends from one lever 8 to the other and is rigidly secured to them.

The operation of my safety-bit is as follows: When the bit is in the position shown in Fig. 1, with the overdraw check-levers forwardly disposed, the bit-bar 6 and the cross-bar 12 rest in the animal's mouth, and the horse may be controlled under ordinary circumstances with the bit in this position. Should the horse, however, show a disposition to kick or become unruly, a pull upon the reins would throw the lower portion of the bit-reins backward to the position shown in Fig. 3, the overdraw-levers 8 moving upward on their pivots to the position shown in said figure. Should the horse attempt to run away, a further pull upon the reins would carry the lower portion of the cheek-rings back to the position shown in Fig. 4, and the bit-bar 6 would slide on the curved bar 5. The sliding of the bit-bar 6 on the bars 5 prevents the horse from stopping the operation of the bit by catching and holding the bar 6 between its teeth. That it could still catch the bar 6 between its teeth is not denied; but its doing so would not prevent the operation of the bit, as this bar would slide freely on the bars 5, thus enabling the rider to bring the bar 12 into action and restrain the horse. When the reins are slacked up, the bit again assumes the position shown in Fig. 1.

From the foregoing it will be obvious that my safety-bit is simple in construction and efficient in use and that unless a strong pull is exerted on the reins the bit is gentle and easy for the horse; but by pulling upon the reins the bit can be made very severe until the animal has been thoroughly controlled.

Having thus fully described my invention, what I claim is—

1. In a safety-bit, the combination of a pair of cheek-rings, a bit-bar slidingly mounted on said rings, and overdraw check-levers, one pivoted to each of said cheek-rings and provided with a connecting-bar, substantially as described.

2. A safety-bit comprising the combination of the two cheek-rings, the bit-bar slidingly mounted on said cheek-rings, the overdraw check-levers pivoted to said rings, the bar connecting said overdraw check-levers, and the guideways on said rings constructed to retain said check-levers and to limit the upward movement thereof, substantially as described.

In testimony whereof I have hereunto set my hand in presence of two subscribing witnesses.

EDMUND C. HAWTHORNE.

Witnesses:
OSCAR F. ELLIS,
PHILIP E. HARRIS.